3,192,264
SULPHONYL ORGANIC PEROXIDES
Klaus Weissermel, Michael Lederer, and Johannes Heyna, Frankfurt am Main, Germany, assignors to Farbwerke Hoechst Aktiengesellschaft vormals Meister Lucius & Brüning, Frankfurt am Main, Germany, a corporation of Germany
No Drawing. Filed Jan. 16, 1962, Ser. No. 166,695
Claims priority, application Germany, Jan. 21, 1961, F 33,029
2 Claims. (Cl. 260—576)

The present invention relates to a process for preparing organic peroxides containing sulfonic groups, and more especially aromatic amines and phenols containing in the molecule the grouping $$ROOCH_2CH_2SO_2—$$

The process of the invention comprises reacting in a one stage reaction an organic hydroperoxide in the presence of an acid-binding substance with a sulfone of the general formula $$A—SO_2—CH_2CH_2—Z$$

in which A stands for an aryl radical and Z represents an acid radical or a quaternary ammonium group. According to a variant of the process of the invention an organic peroxide is reacted in the presence of a basic catalyst with a vinylsulfone of the general formula $$A—SO_2CH=CH_2$$

in which A has the meaning given above, and which carries at least one amino group or hydroxyl group. The radical A is a mono- or polynuclear, preferably binuclear, aromatic radical, which is, in general, isocyclic and carries substituents, advantageously an amino group and/or a hydroxyl group. The same nucleus can carry several of these groups which may be substituted by hydrocarbon radicals. The aromatic nucleus can furthermore carry, in addition to an amino group or a hydroxyl group, other substituents such as halogen atoms, sulfonic groups, nitro groups, or carboxylic groups. The presence of an amino group or a hydroxyl group is preferred but not critical. A can furthermore represent an unsubstituted aryl radical.

When the radical Z is an acid radical, it is preferably an inorganic acid radical, especially the sulfuric acid radical —O—SO_3—H. Other suitable inorganic acid radicals are the ortho-phosphoric acid radical and hydrohalic acid radicals, especially the hydrogen chloride and hydrogen bromide radical. In some cases Z may also represent an organic acid radical, for example the formate, acetate or benzoate radical. In case the radical Z is a quaternary ammonium radical, it can be a radical of a compound derived from any tertiary amine, such as trimethyl amine, triethyl amine, dimethylcyclohexyl amine, or dimethyl aniline. In compounds of the A—SO_2CH_2CH_2—Z series, the ethylene group and, in compounds of the $$A—SO_2—CH=CH_2$$

series, the vinyl group may be substituted, for example by alkyl groups or chlorine atoms.

The preferred reactions of the invention can be illustrated by the following equations:

(I) $HO_3SO—CH_2—CH_2—SO_2—A+ROOH$
$\rightarrow ROO—CH_2—CH_2—SO_2—A+H_2SO_4$ (II) $X—CH_2—CH_2—SO_2—A+ROOH$
$\rightarrow ROO—CH_2—CH_2—SO_2—A+HX$ (III) $[(R')_3N—CH_2—CH_2—SO_2—A]^+X^-ROOH$
$\rightarrow ROO—CH_2—CH_2—SO_2—A+(R')_3N+HX$ (IV) $H_2C=CH—SO_2—A+ROOH$
$\rightarrow ROO—CH_2—CH_2—SO_2—A$ X=halogen and preferably chlorine or bromine.

In many cases, it is especially advantageous to prepare the peroxides of the invention according to Equation I, since by this reaction the industrially well accessible β-hydroxyethylarylsulfone-sulfuric acid esters are converted in water and in the presence of acid-binding agents into the desired peroxides in a high yield.

The reactions of other β-hydroxyethyl-aryl-sulfone-mineral acid esters, for example the reaction of a β-hydroxyethyl-aryl-sulfone-phosphoric acid ester, with a hydroperoxide take place in analogous manner. The preparation of peroxides according to Equation III is likewise carried out in an aqueous medium. On account of the fact that the sulfones used in the reaction of Equation II are sparingly soluble in water this reaction is preferably carried out in an inert organic solvent, such as tetrahydrofurane, dioxane, benzene or cyclohexane.

For producing peroxides according to Equation IV it is of advantage to use β-hydroxyethyl-arylsulfone-sulfuric acid esters which are converted into vinylarylsulfones by splitting off sulfuric acid. This is done in a manner such that the sulfuric acid ester is treated with an at least equivalent amount of an alkaline substance at a temperaure suitably in the range of about 0° C. to 60° C. and possibly higher. For example, 100° C. As alkaline substances there are advantageously used aqueous solutions of the hydroxides or carbonates of the alkali metals or the hydroxides of the alkaline earth metals, for example sodium hydroxide, potassium hydroxide, the acid or neutral carbonates of sodium and potassium, calcium hydroxide or magnesium hydroxide. Under the action of these substances the sulfuric acid ester of the β-hydroxyethyl-arylsulfone, as far as it is not present as alkali metal salt, is first neutralized and under the further action of the alkaline substance the sulfuric acid radical is split off as alkali metal or alkaline earth metal sulfate, while the arylvinylsulfone remains behind. The alkaline substances must be added in an amount such that at the end of the reaction the solution has a pH value of at least 7.5 and preferably in the range of 9 to 12. This means that sodium hydroxide or potassium hydroxide as splitting agent, for example, require about 2 to 2.5 mols of aqueous base of 40 to 50% strength to be used, for example, for one mol of organic sulfonyl compound. Instead of the afore-said alkali metal and alkaline earth metal compounds there may be used strong quaternary ammonium bases $$[R'_4N]^+OH^-$$

wherein R' represents low molecular weight alkyl radicals, especially the methyl and ethyl radicals, such, for example, as tetramethyl-ammonium hydroxide or tetraethyl-ammonium hydroxide. The vinyl-arylsulfones obtained can be separated from the alkaline reaction mixture by filtration since they are insoluble in the aqueous phase. They are then dissolved in one of the solvents mentioned above and reacted with hydroperoxides, preferably with tertiary alkyl-hydroperoxides, in the presence of a basic catalyst. In some cases, it is likewise possible to add to the alkaline mixture of the sulfate of the β-hydroxyethyl-arylsulfone and the alkaline substance the hydroperoxide without isolating the vinylarylsulfone, and an organic solvent, if necessary. The desired peroxide is prepared in this medium.

Although the high reactivity of nucleophilic compounds with vinylaryl- and vinylalkyl-sulfones has been known for a long time, it could not be foreseen that the reaction of the invention would take place insuch a smooth manner for the following reasons:

In the presence of a basic catalyst and in the absence of hydroperoxide aminoarylsulfones are rapidly and in most cases quantitatively polymerized. Moreover, when, instead of tertiary hydroperoxides, tertiary alcohols are added on the sulfones under the same conditions there are not obtained the corresponding tertiary ethers but a preponderant proportion of polymers. Still further it is known that substituted arylvinylsulfones, for example amino-arylvinylsulfones, can be polymerized in the presence of free radical-liberating compounds. Consequently, it was surprising that in the process of the invention monomeric products are formed in the presence of hydroperoxides.

Furthermore, it is surprising that in the manufacture of peroxides according to Equations I–IV with the preferred use of starting products containing aminoaryl and/or hydroxyaryl groups under the chosen reaction conditions no oxidation products can be isolated, although it is known that hydrogen peroxide and its derivates oxidize amines and phenols.

Suitable sulfonic group containing starting materials in the process of the present invention are, for example the sulfuric acid esters of 4-amino-1-β-hydroxyethyl-sulfonylbenzene,
3-amino-1-β-hydroxyethyl-sulfonylbenzene,
4-methoxy-3-amino-1-β-hydroxyethyl-sulfonylbenzene,
4-chloro-3-amino-1-β-hydroxyethyl-sulfonylbenzene,
4-hydroxy-3-amino-1-β-hydroxyethyl-sulfonylbenzene,
5-methoxy-4-amino-2-methyl-1-β-hydroxyethyl-sulfonyl-benzene,
1-amino-4-β-hydroxyethyl-sulfonylnaphthalene,
4-hydroxy-1-β-hydroxyethyl-sulfonylbenzene,
3-hydroxy-1-β-hydroxyethyl-sulfonylbenzene,
4-amino-1-β-chloroethyl-sulfonylbenzene,
m-[β-chloroethyl-sulfonyl]-benzoic acid,
β[4-aminobenzene-sulfonylethyl]-trimethyl-ammonium chloride,
4-amino-vinyl-sulfonylbenzene,
β-benzenesulfonyl-ethyl-trimethylammonium chloride,
4-amino-vinylsulfonylnaphthalene,
4-chloro-3-amino-1-vinylsulfonylbenzene,
5-methoxy-4-amino-2-methyl-vinyl-sulfonylbenzene,
4-hydroxy-1-vinylsulfonylbenzene,
o-methyl-p-dimethylamino-p'-vinylsulfonyl-azobenzene.

All these starting compounds are characterized in that under the action of hydroperoxides they are converted into peroxides containing the grouping

ROOCH₂CH₂SO₂—

When using bi- or poly-functional starting compounds containing sulfonic groups products can be obtained in the molecule of which the afore-said grouping is present twice or more.

Hydroperoxides which can be used in the process of the invention have the formula ROOH in which R stands for a straight chain or branched aliphatic hydrocarbon radical or a cycloaliphatic hydrocarbon radical having preferably 1 to 15 carbon atoms. In general, in the process of the invention there can be used all hydroperoxides which are sufficiently stable under the reaction conditions. The stability increases from the primary hydroperoxides via the secondary hydroperoxides to the tertiary hydroperoxides, so that in the reactions tertiary hydroperoxides are especially suitable. There are mentioned by way of example: tertiary butylhydroperoxide, tertiary amylhydroperoxide, cumene-hydroperoxide, indane-hydroperoxide, pinane - hydroperoxide, tetrahydronaphthalene - hydroperoxide, 1,1-dichloromethylpropyl-hydroperoxide, cyclohexyl-hydroperoxide, isopropyl-hydroperoxide, 1-methyl-cyclohexyl-hydroperoxide, benzyl-hydroperoxide, ethyl-hydroperoxide, para-menthane-hydroperoxide, or tetrahydrofurane-hydroperoxide.

The hydroperoxides are suitably used in at least equivalent amounts, calculated on the starting compounds to be reacted. The β-substituted alkyl-aminoarylsulfones or β-substituted alkylhydroxyarylsulfones are reacted with the hydroperoxides in aqueous solution in the presence of acid-binding agents. Especially favorable acid-binding agents are alkali metal and alkaline earth metal hydroxides such as NaOH, KOH, Ba(OH)₂ or Ca(OH)₂. It is likewise possible, of course, to use the carbonates of said metals or organic bases such as dimethylaniline or pyridine. The acid-binding agents which, with the exception of organic bases that are sparingly soluble in water, are used in dilute or concentrated aqueous solutions, are employed in an amount such that at the end of the reaction the mixture has a constant alkaline reaction. At the end of the reaction, the reaction solution shall advantageously have a pH value in the range of 8 to 12.5.

The alkali metal and alkaline earth metal hydroxides mentioned above are also suitable in the form of concentrated aqueous solutions as basic catalysts for the reactions of vinyl-aminoarylsulfones or vinyl-hydroxyarylsulfones in an organic solvent. It is especially suitable, however, to use as catalysts for the nucleophilic addition of the hydroperoxides on the activated double bond quaternary ammonium bases, for example benzyltrimethyl-ammonium hydroxide, ethyltrimethyl-ammonium hydroxide or tetramethyl-ammonium hydroxide. The catalyst concentration can vary within wide limits, preferably between 0.5 and 8% by weight, calculated on the total weight of the reactants.

Suitable solvents for the vinyl-aminoarylsulfones or vinylhydroxyarylsulfones are tetrahydrofurane, dioxane, benzene or cyclohexane, i.e. solvents which do not affect the nucleophilic addition. In some cases the addition of a special solvent can be dispensed with and the reaction can be carried out in the presence of an excess of liquid peroxide ROOH.

The reaction of the starting compounds containing sulfonic groups with the hydroperoxide takes place very rapidly already at room temperature. In general, the reaction is carried out at temperatures in the range of 0° C. to 60° C. The most favorable temperature to be applied depends on the stability of the hydroperoxide and the reaction product. In many cases it is, therefore, possible to operate at a temperature outside the defined range.

The peroxides prepared by the process of the invention are novel compounds which are preponderantly crystalline and are obtained in most cases directly in a very pure form. If necessary, they can be recrystallized from an organic solvent such as benzene, cyclohexane or methanol.

The thermal stability of the peroxides of the invention varies according to the circumstances and depends on the structure of the peroxide grouping. The stability of the reaction products of β-substituted alkyl-aminoarylsulfones with tertiary butyl hydroperoxide can be compared with the stability of ditertiary butyl peroxide. Iodine, for example, is set free from said reaction products in acetic acid solution in the heat only and the peroxide groupings decompose to a perceptible degree at a temperature of above 100° C. The compounds are insensitive to impact and puff off in the flame.

The peroxide-containing aromatic amines and phenols can be used for many purposes, for example for the manufacture of condensation products containing peroxide groups, which condensation products can then be modified via the peroxide groupings. The products of the invention are furthermore suitable for the manufacture of free radical-liberating dyestuffs, especially free radical-liberating azo-dyestuffs. Still further, the process products are valuable vulcanization accelerators for elastomers, for example for ethylene/propylene copolymers.

The aromatic amines containing peroxide groups and obtained by the process of the invention can be diazotized by usual methods and are, therefore, valuable intermediate products, especially in the form of the rather stable diazonium salts. From among the great number of reactions characteristic of diazonium salts some are illustrated by the following equations in which a peroxide is used containing an aminophenyl radical in the molecule:

(a)
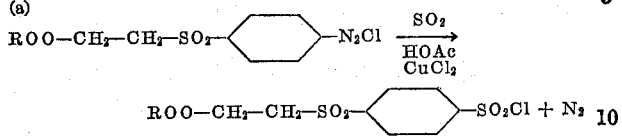

(b)
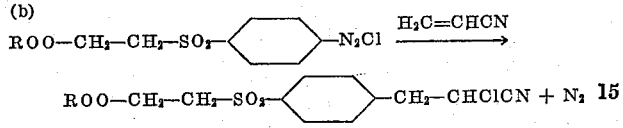

(c)
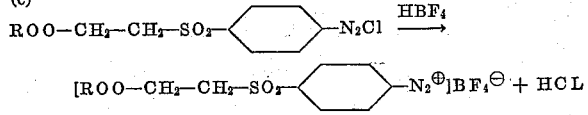

(d)
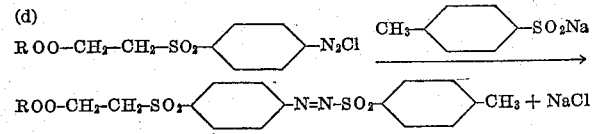

According to Equation c a bifunctional catalyst is obtained which liberates free radicals (peroxide grouping) and has likewise a cationic action (diazonium fluoroborate grouping).

According to Equation d a bifunctional catalyst is obtained which liberates free radicals via the azo group at a temperature below 100° C. and via the peroxide group at a temperature above 100° C. Acrylic esters, for example, are polymerized at a temperature of about 80° C. in the presence of a catalyst prepared according to Equation d, i.e., conditions under which the decomposition of the peroxide grouping is improbable.

The following examples serve to illustrate the invention, but they are not intended to limit it thereto. Examples 1–4 describe reactions according to Equations I to IV. In the table, the column "Method" indicates according to which Equation I, II, III or IV the reaction has been conducted. Examples 21–24 relate to reactions carried out with some of the process products. In the examples the parts are by weight unless otherwise stated.

*Example 1.—(Method I)*

12 parts of the sulfuric acid ester of 4-amino-1-β-hydroxyethylsulfonyl-benzene (industrially pure, i.e., about 95% by weight) were dissolved in 50 parts of water and about 7 parts of sodium hydroxide solution (1:1) and the solution was neutralized (pH 7.2). The aqueous solution was clarified with a little active carbon, filtered off and 8 parts of tertiary butyl hydroperoxide were added to the filtrate. Semi-concentrated aqueous sodium hydroxide solution was then slowly added at 20–35° C. until the reaction mixture had a constant alkalinity of pH 12–12.5. In the course of the reaction mixture became turbid and the reaction product precipitated from the aqueous solution in the form of fine crystals. The reaction mixture was stirred for a further 1–2 hours at 30–35° C., filtered off with suction after the addition of 250 parts of water and 10 parts of 2 N sodium hydroxide solution, the residue was washed with water until neutral and dried at 30° C. under reduced pressure. The yield amounted to 8 parts. The crude product melted at 97–98° C.; at about 130° C. the melt started to discolor and in the range of 150 to 165° C. the reaction product decomposed with the evolution of gas. The reaction product

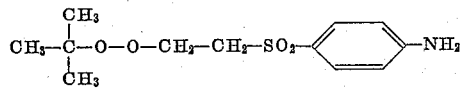

was soluble in tetrahydrofurane, acetone, methanol and hot water and insoluble in petroleum ether. After having been recrystallized once in methanol the product melted at 99–101° C.

| Analysis | C | H | N | S |
|---|---|---|---|---|
| $C_{12}H_{19}SO_4N$ (263.0): | | | | |
| Calculated | 52.7 | 6.9 | 5.1 | 11.7 |
| Found | 52.7 | 7.0 | 5.6 | 11.2 |
| Do | 52.3 | 7.0 | 5.6 | |

*Example 2.—(Method II)*

5.5 parts of 4-amino-1-β-chloroethylsulfonyl-benzene were suspended in 25 parts of water and the suspension was combined with a solution of 3.5 parts of tertiary butyl-hydroperoxide in 40 parts of tetrahydrofurane. At 20–30° C. there were then added 5 parts of potassium hydroxide solution (40% strength by weight) and the mixture was stirred for 2 hours. The turbid solution was poured on to 200 parts of ice water whereby the reaction product precipitated in the form of crystals. The reaction product of the formula given in Example 1 was filtered off with suction, the residue was washed first with dilute hydroxide solution and then with water and dried at 40° C. under reduced pressure. The yield amounted to 7 parts by weight. The crude product melted at 91–98° C. and decomposed in the range of 140–160° C. with evolution of gas.

*Example 3.—(Method III)*

5 parts of β-[4-aminobenzene-sulfonylethyl]-trimethylammonium sulfate, prepared by reacting the sulfuric acid ester of 4-amino-1-β-hydroxyethyl-sulfonyl-benzene with trimethylamine, were dissolved in 30 parts of water and the solution was combined with 3 parts of tertiary butyl-hydroperoxide. Subsequently, potassium hydroxide solution (40% strength) was slowly added while stirring, until the mixture had an alkaline reaction (pH 11–12). In the course of the reaction, which took place at 20–35° C., the reaction product precipitated. The mixture was stirred for 2 hours, filtered off, the residue was washed until it was neutral and dried under reduced pressure at room temperature. The crude product having the formula given in Example 1 melted at 94–98° C. and decomposed in the range of 140–160° C. with the evolution of gas.

*Example 4.—(Method IV)*

35 parts of 3-amino-1-vinylsulfonyl-benzene, prepared from the sulfuric acid ester of 3-amino-1-β-hydroxyethyl-sulfonyl-benzene by splitting off sulfuric acid in the presence of concentrated potassium hydroxide solution, were dissolved in 60 parts of tetrahydrofurane and at 10–30° C. a solution consisting of 20 parts of tertiary butyl-hydroperoxide and 0.4 part of benzyl-trimethylammonium hydroxide (35% strength by weight in methanol) was added. The mixture was stirred for 2 hours and then stirred into 200 parts of ice water and 10 parts of 2 N sodium hydroxide solution. The reaction product precipitated in the form of crystals. The mixture was fiiltered, the residue was washed with water until it was neutral and dried at room temperature under reduced pressure. The yield of the product having the formula

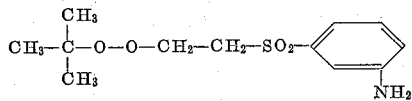

amounted to 38 parts.

| Analysis | C | H | N | S |
|---|---|---|---|---|
| $C_{12}H_{19}SO_4N$ (273.0): | | | | |
| Calculated | 52.7 | 6.9 | 5.1 | 11.7 |
| Found | 52.5 | 6.8 | 5.4 | 11.8 |
| Do | 52.9 | 6.8 | 5.6 | 12.0 |

| Ex. No. | Starting product, parts by weight | Hydroperoxide, parts by weight | Base (percent strength) | Reaction temperature, °C. | Reaction time | Yield, parts by weight | Method |
|---|---|---|---|---|---|---|---|
| 5 | 38 HO₃SOCH₂CH₂SO₂—⟨C₆H₄⟩—NH₂ | 18 CH₃—C(C₂H₅)(CH₃)—COOH | NaOH (40) | 10-38 | 2 hrs. 40 mins. | 21 | I |
| 6 | 60 HO₃SOCH₂CH₂SO₂—⟨C₆H₄⟩—NH₂ | 40 (cyclohexyl)—C(CH₃)(CH₃)—OOH | KOH (40) | 10-40 | 2 hrs. 10 mins. | 53 | I |
| 7 | 65 H₂C=CHSO₂—⟨C₆H₄⟩—NH₂ | 35 CH₃—C(CH₃)(CH₃)—COOH | [C₆H₅CH₂—N(CH₃)(CH₃)(CH₃)]⊕ OH⊖ | 10-20 | 2 hrs. 50 mins. | 85 | IV |
| 8 | 40 H₂C=CHSO₂—⟨C₆H₄⟩—NH₂ | 50 (pinanyl)—C(CH₃)—OOH | KOH (40) | 10-35 | 2 hrs. | 42 | IV |
| 9 | 50 ClCH₂CH₂SO₂—⟨C₆H₄⟩—NH₂ | 29 CH₃—C(CH₃)(CH₃)—COOH | KOH (40) | 20-30 | 3 hrs. | 40 | II |
| 10 | 60 HO₃SOCH₂CH₂SO₂—⟨C₆H₃(OCH₃)(CH₃)⟩—NH₂ | 25 CH₃—C(CH₃)(CH₃)—COOH | KOH (35) | 10-35 | 3 hrs. 20 mins. | 36 | I |
| 11 | 42 H₂C=CHSO₂—⟨C₆H₄⟩—NH₂ | 25 CH₃—C(CH₃)(CH₃)—COOH | NaOH (45) | 10-35 | 4 hrs. | 26 | IV |
| 12 | 29 HO₃SOCH₂CH₂SO₂—⟨C₆H₃Cl⟩—NH₂ | 12 CH₃—C(CH₃)(CH₃)—COOH | NaOH (40) | 10-35 | 1 hr. 30 mins. | 19 | I |
| 13 | 10 H₂C=CHSO₂—⟨naphthyl⟩—NH₂ | 7 CH₃—C(CH₃)(CH₃)—COOH | [C₆H₅CH₂—N(CH₃)(CH₃)(CH₃)]⊕ OH⊖ | 25-35 | 2 hrs. 20 mins. | 9 | IV |

| Ex. No. | Starting product, parts by weight | Hydroperoxide, parts by weight | Base (percent strength) | Reaction temperature, °C. | Reaction time | Yield, parts by weight | Method |
|---|---|---|---|---|---|---|---|
| 14 | 4.9 HO₃SOCH₂CH₂SO₂—(naphthyl) | 25 CH₃—C(CH₃)(CH₃)—COOH | KOH (30) | 25–35 | 1 hr. | 4 | I |
| 15 | 10 [CH₃—N(CH₃)—CH₂CH₂SO₂—C₆H₄—]⁺ Cl⁻ | 9 CH₃—C(CH₃)(CH₃)—COOH | KOH (35) | 25–45 | 1 hr. 30 mins. | 5.4 | III |
| 16 | 14.5 HO₃SOCH₂CH₂SO₂N(CH₃)—C₆H₄—NH₂ | 8 CH₃—C(CH₃)(CH₃)—COOH | KOH (40) | 20–35 | 2 hrs. 40 mins. | 12 | I |
| 17 | 6 H₂C=CHSO₂—C₆H₄—OH | 7 CH₃—C(CH₃)(CH₃)—COOH | KOH (35) | 20–40 | 1 hr. | 7 | IV |
| 18 | 7.5 HO₃SOCH₂CH₂SO₂—C₆H₄—OH | 7 CH₃—C(CH₃)(CH₃)—COOH | NaOH (40) | 20–40 | 1 hr. 30 mins. | 4 | I |
| 19 | 11.5 ClCH₂CH₂SO₂—C₆H₄—COOH | 7 CH₃—C(CH₃)(CH₃)—COOH | KOH (40) | 20–40 | 1 hr. 50 mins. | 10.5 | II |
| 20 | 10 H₂C=CHSO₂—C₆H₄—N=N—C₆H₄—N(CH₃)(CH₃) | 10 CH₃—C(CH₃)(CH₃)—COOH | KOH (40) | 30–40 | 2 hrs. | 8 | IV |

| Ex. No. | Reaction product | Summation formula | Elementary analysis | | | | | Melting point, °C. |
|---|---|---|---|---|---|---|---|---|
| | | | C | H | N | S | O activ. | |
| 5 | C₂H₅—C(CH₃)(CH₃)—COOCH₂CH₂SO₂—C₆H₄—NH₂ | C₁₃H₂₁SO₄N (287.0) | c. 54.3<br>f. 54.5<br>f. 54.6 | 7.3<br>6.9<br>7.2 | 4.8<br>4.4<br>4.7 | 11.1<br>11.2<br>11.4 | 5.6<br>5.4<br>5.6 | 39–41 |
| 6 | (C₆H₅)—C(CH₃)(CH₃)—COOCH₂CH₂SO₂—C₆H₄—NH₂ | C₁₇H₂₁SO₄N (335.0) | c. 61.0<br>f. 61.0<br>f. 61.1 | 6.3<br>6.4<br>6.4 | 4.2<br>4.2<br>4.3 | 9.6<br>9.0<br>9.0 | — | 70–75 |

| Ex. No. | Reaction product | Summation formula | Elementary analysis | | | | | Melting point, °C. |
|---|---|---|---|---|---|---|---|---|
| | | | C | H | N | S | O activ. | |
| 7 | CH₃–COOCH₂CH₂SO₂–⟨phenyl⟩–NH₂ with CH₃ groups | C₁₂H₁₉SO₄N (273.0) | c. 52.7<br>f. 51.8<br>f. 52.6 | 6.9<br>6.9<br>7.4 | 5.1<br>5.2<br>5.3 | 11.7<br>11.0<br>11.3 | 5.9<br>5.7<br>5.8 | 101–102 |
| 8 | bornyl–OOCH₂CH₂SO₂–⟨phenyl⟩–NH₂ isolated as hydrochloride | C₁₈H₂₇SO₄N·HCl (389.5) | c. 55.4<br>f. 54.2<br>f. 54.5 | 7.2<br>6.9<br>7.0 | 3.6<br>3.7<br>3.8 | 8.2<br>8.1<br>8.3 | | |
| 9 | CH₃–COOCH₂CH₂SO₂–⟨phenyl⟩–NH₂ with CH₃ groups | C₁₂H₁₉SO₄N (273.0) | c. 52.7<br>f. 52.3<br>f. 52.0 | 6.9<br>6.7<br>7.0 | 5.1<br>5.5<br>5.6 | 11.7<br>11.5<br>11.6 | 5.9<br>5.5<br>5.9 | 50–55 |
| 10 | CH₃–COOCH₂CH₂SO₂–⟨phenyl(NH₂)⟩–OCH₃ | C₁₃H₂₁SO₅N (303.0) | c. 51.5<br>f. 51.6<br>f. 51.8 | 6.9<br>7.0<br>7.0 | 4.6<br>4.8<br>4.8 | 10.5<br>10.9<br>10.4 | 5.3<br>5.4<br>5.4 | 67–77 |
| 11 | CH₃–COOCH₂CH₂SO₂–⟨phenyl(OCH₃)⟩–NH₂ with CH₃ | C₁₄H₂₃SO₅N (317.0) | c. 53.0<br>f. 50.9<br>f. 50.6 | 7.2<br>6.9<br>7.0 | 4.4<br>4.8<br>4.6 | 10.1<br>9.6<br>9.8 | 5.1<br>5.1<br>5.3 | 98–99 |
| 12 | CH₃–COOCH₂CH₂SO₂–⟨phenyl(NH₂)⟩–Cl | C₁₂H₁₈SO₄NCl (307.5) | c. 46.9<br>f. 45.8<br>f. 46.0 | 5.9<br>5.4<br>5.5 | 4.6<br>4.7<br>4.8 | 10.4<br>10.4<br>10.6 | 5.2<br>4.6<br>4.8 | 89–90 |
| 13 | CH₃–COOCH₂CH₂SO₂–⟨naphthyl⟩–NH₂ | C₁₆H₂₁SO₄N (323.0) | c. 59.4<br>f. 59.1<br>f. 5.9 | 6.5<br>6.4<br>6.5 | 4.3<br>4.2<br>4.2 | 9.9<br>9.4<br>9.6 | | 120–130 |
| 14 | CH₃–COOCH₂CH₂SO₃–⟨naphthyl⟩ | C₁₆H₂₀SO₄ (308.0) | c. 62.3<br>f. 61.8<br>f. 62.1 | 6.5<br>6.5<br>6.2 | | 10.4<br>10.7<br>10.8 | 5.2<br>5.4<br>5.3 | 71–73 |

| Ex. No. | Reaction product | Summation formula | Elementary analysis | | | | Melting point, °C. |
|---|---|---|---|---|---|---|---|
| | | | C | H | N | S | O activ. | |

| Ex. No. | Reaction product | Summation formula | | C | H | N | S | O activ. | Melting point, °C. |
|---|---|---|---|---|---|---|---|---|---|
| 15 | CH₃—C(CH₃)(CH₃)—COOCH₂CH₂SO₂—⟨phenyl⟩ | C₁₂H₁₆SO₄ (258.0) | c. f. f. | 55.8 55.2 54.9 | 7.0 6.9 6.7 | — — — | 12.4 12.2 12.1 | 6.2 6.2 6.4 | oil <20 |
| 16 | CH₃—C(CH₃)(CH₃)—COOCH₂CH₂SO₂N(CH₃)—⟨phenyl⟩—NH₂ | C₁₃H₂₂SO₄N₂ (302.0) | c. f. f. | 51.7 51.7 51.9 | 7.3 7.3 7.4 | 8.9 9.6 9.4 | 10.2 10.7 10.7 | 5.3 4.9 4.7 | 127–000 |
| 17 | CH₃—C(CH₃)(CH₃)—COOCH₂CH₂SO₂—⟨phenyl⟩—OH | C₁₂H₁₈SO₅ (274.0) | c. f. f. | 52.5 50.4 50.0 | 6.5 6.0 6.0 | — — — | 11.6 11.3 11.6 | 5.8 4.9 5.2 | 168–170 |
| 18 | CH₃—C(CH₃)(CH₃)—COOCH₂CH₂SO₂—⟨phenyl with OH⟩ | C₁₂H₁₈SO₅ (274.0) | c. f. f. | 52.5 52.9 52.9 | 6.5 6.5 6.7 | — — — | 11.6 11.6 11.5 | — — — | oil |
| 19 | CH₃—C(CH₃)(CH₃)—COOCH₂CH₂SO₂—⟨phenyl⟩—COOH | C₁₃H₁₈SO₆ (302.0) | c. f. f. | 51.6 50.3 50.4 | 6.0 5.6 6.0 | — — — | 10.6 10.5 10.5 | 5.3 4.9 5.2 | 146–147 |
| 20 | CH₃—C(CH₃)(CH₃)—COOCH₂CH₂SO₂—⟨phenyl⟩—N=N—⟨phenyl(CH₃)⟩—N(CH₃)₂ | C₂₁H₂₈SO₄N₃ (419.0) | c. f. f. | 60.2 60.1 60.0 | 6.9 6.9 6.9 | 10.0 10.2 10.2 | 7.6 7.6 7.7 | — — — | — |

Example 21.—Preparation of a peroxide-containing azo-dyestuff

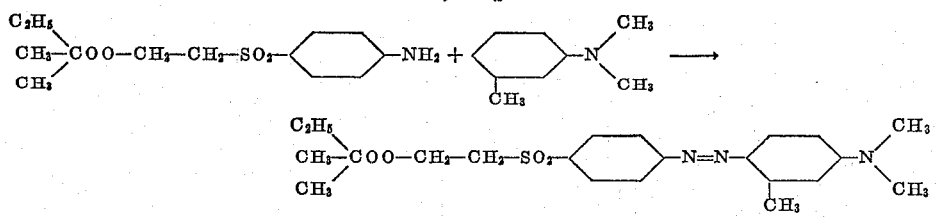

(A) *Preparation of the solution of the diazonium salt.*—5.8 parts of β-4-aminobenzene-sulfonyl-ethyl-t-amyl peroxide were suspended in 30 parts of 2 N HCl and diazotized at 5° C. with a 1 N NaNO$_2$ solution. In the course of the diazotization the diazonium salt largely precipitated.

(B) *Preparation of the solution of the coupling component.*—2.75 parts of 3-dimethylaminotoluene were dissolved in 250 parts of water and 12 parts of 2 N hydrochloric acid.

(C) *Coupling.*—Solution A was combined with solution B at 10° C. and sodium acetate was added to the mixture until it was neutral to Congo paper (pH 3.8). In the course of the coupling the dyestuff precipitated from the aqueous solution. The coupling being terminated, the dyestuff was filtered off with suction, washed until the wash water was free from chlorine ions and dried. 7.3 parts of dyestuff were obtained.

| Analysis | C | H | N | S |
|---|---|---|---|---|
| C$_{22}$H$_{31}$SO$_4$N$_3$ (433.0): | | | | |
| Calculated | 61.0 | 7.1 | 9.7 | 7.4 |
| Found | 59.4 | 7.0 | 9.0 | 7.4 |
| Do | 59.5 | 6.8 | 8.8 | 7.5 |

The dyestuff could be used for dyeing polyacrylonitrile and polyesters scarlet tints. The colorations were distinguished by a good fastness to light, washing and rubbing.

Example 22.—Preparation of an aromatic sulfonic acid chloride by the method of H. Meerwein

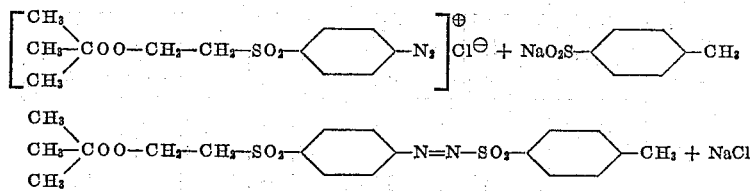

27.5 parts of β-4-aminobenzene-sulfonylethyl-t-butyl-peroxide were suspended at 5° C. in 60 parts of hydrochloric acid of 25% strength and diazotized with 5 N sodium nitrite solution. The diazonium salt solution was rapidly added to a glacial acetic acid solution saturated with sulfur dioxide and containing 2 parts of cupric chloride. The reaction started at 5° C. with strong evolution of gas and it was terminated in a few minutes. The reaction mixture was diluted with 400 parts of ice water, the reaction product was filtered off with suction, the residue was washed with ice water until it was neutral to Delta paper, and dried under reduced pressure over phosphorus pentoxide. The yield of crude product amounted to 19 parts. After having recrystallized once from benzene, the sulfonic acid chloride melted at 125–126° C. with decomposition.

| Analysis | C | H | S | Cl |
|---|---|---|---|---|
| C$_{12}$H$_{17}$S$_2$O$_6$Cl (356.5): | | | | |
| Calculated | 40.4 | 4.8 | 17.9 | 9.9 |
| Found | 40.7 | 4.9 | 17.8 | 9.1 |
| Do | 41.0 | 4.9 | 18.1 | 9.1 |

Example 23.—Preparation of a diazosulfone

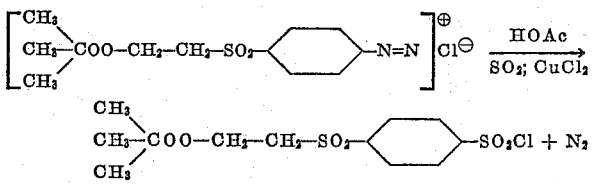

13.6 parts of β-4-aminobenzene-sulfonylethyl-t-butyl peroxide were diazotized in usual manner in 75 parts of 2 N hydrochloric acid with 5 N sodium nitrite solution and to the reaction mixture there was added at 8° C. a solution of 10.5 parts of sodium p-toluyl-sulfinate (85% strength) in 100 parts of water. In the course of the reaction the orange reaction product precipitated. After 2 hours the reaction product was filtered off, washed, and dried. 17 parts of crude product were obtained. After having been recrystallized from ether the reaction product melted at 100° C. with decomposition.

| Analysis | C | H | N | S |
|---|---|---|---|---|
| C$_{19}$H$_{24}$O$_6$N$_2$S$_2$ (440.6): | | | | |
| Calculated | 51.8 | 5.5 | 6.4 | 14.5 |
| Found | 51.7 | 5.4 | 6.9 | 14.2 |
| Do | 51.9 | 5.5 | 7.1 | 14.2 |

Example 24.—Addition of a peroxide-containing diazonium salt on acrylonitrile

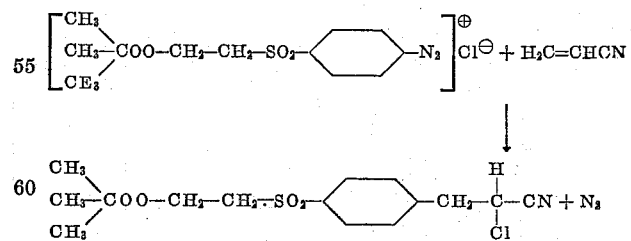

13.6 parts of β-4-aminobenzene-sulfonylethyl-t-butyl peroxide were diazotized in usual manner. 3 parts of glacial acetic acid and 10 parts of water were adjusted to pH 6 by adding sodium hydroxide solution of 40% strength and to the mixture there were added 1.5 parts of cupric chloride, 2.5 parts of acrylonitrile and 25 parts of acetone. The diazonium salt solution was dropped at 25° C. into the solution thus obtained and the whole was heated to 40° C. The reaction started with evolution of nitrogen. The reaction product precipitated in the course of the reaction. It was filtered off after 2 hours, washed and dried. 7.9 parts of crude product were obtained. The crude product was dissolved in methanol, filtered off, precipitated with water and dried. The product was obtained in the form of fine needles having a melting point of 100° C.

| Analysis | C | H | N | Cl |
|---|---|---|---|---|
| $C_{15}H_{20}O_4NClS$ (345.9): | | | | |
| Calculated | 52.1 | 5.8 | 4.1 | 10.3 |
| Found | 51.8 | 5.7 | 4.3 | 10.7 |
| Do | 51.9 | 5.8 | 4.3 | 10.8 |

We claim:
1. A peroxide of the formula

$$A-SO_2-CH_2-CH_2-OOR$$

wherein A is a member selected from the group consisting of phenyl, naphthyl, and these members substituted with at least one member of the group consisting of hydroxy, amino, alkoxy, and alkylamino, and R is a member selected from the group consisting of aliphatic and cycloaliphatic hydrocarbon having 1 to 15 carbon atoms.

2. A peroxide as in claim 1 wherein R is linked to the oxygen atom of the peroxide group by a tertiary carbon atom.

References Cited by the Examiner

Lewin et al., J. Prakt. Chem., 127 77–91 (1930).

CHARLES B. PARKER, *Primary Examiner.*

DANIEL D. HORWITZ, *Examiner.*